(12) United States Patent
Ying et al.

(10) Patent No.: US 8,090,017 B2
(45) Date of Patent: Jan. 3, 2012

(54) METHOD AND APPARATUS FOR CODING INTERLACED VIDEO DATA

(75) Inventors: Chen Ying, Beijing (CN); Jerome Vieron, Bedde (FR); Vincent Bottreau, Chateaubourg (FR); Edouard Francois, Bourg des Comptes (FR); Patrick Lopez, Livre sur Changeon (FR)

(73) Assignee: Thomson Licensing, Boulogne-Billancourt (FR)

( * ) Notice: Subject to any disclaimer, the term of this patent is extended or adjusted under 35 U.S.C. 154(b) by 846 days.

(21) Appl. No.: 12/087,558

(22) PCT Filed: Dec. 5, 2006

(86) PCT No.: PCT/EP2006/069290
§ 371 (c)(1),
(2), (4) Date: Jul. 9, 2008

(87) PCT Pub. No.: WO2007/080032
PCT Pub. Date: Jul. 19, 2007

(65) Prior Publication Data
US 2009/0067496 A1  Mar. 12, 2009

(30) Foreign Application Priority Data

Jan. 13, 2006 (EP) .................................. 06300032

(51) Int. Cl.
*H04N 7/12* (2006.01)
(52) U.S. Cl. ................................................ 375/240.03
(58) Field of Classification Search ......... 375/240.01–240.29; *H04N 7/12*
See application file for complete search history.

(56) References Cited

U.S. PATENT DOCUMENTS
5,410,352 A  4/1995  Watanabe

FOREIGN PATENT DOCUMENTS
WO  WO 2004/080078  9/2004

OTHER PUBLICATIONS

Thomas Wiegand, Joint Video Team (JVT) of ISO/IEC MPEG & ITU-T VCEG, May 2002, pp. 68-72, JVT-C039.doc.*
S-W Park et al: "Inter layer motion prediction for SVC interlaced coding" Joint Video Team (JVT) of ISO/IEC MPEG & ITU-T VCEG, 18th meeting: Bangkok, TH, Jan. 2006 XP002381149.
JVT: "Joint Scalable Video Model JSVM-4" Joint Video Team (JVT) of ISO/IEC MPEG & ITU-T VCEG, 17th meeting: Nice, France, Oct. 2005, XP002381150.
Internet Article: "Index of/av-arch/jvt-site/2006_01_Bangkok", ITU-T, JVT Site, May 12, 2006, XP002381151.
Search Report Dated Mar. 22, 2007.

* cited by examiner

*Primary Examiner* — Young Lee
*Assistant Examiner* — Paola Abi Nader
(74) *Attorney, Agent, or Firm* — Robert D. Shedd; Jeffrey M. Navon

(57) ABSTRACT

Often hierarchical bi-directionally predicted frame structures are used for encoding a video picture sequence. The frames may consist of interlacing fields. A method for encoding interlaced video, wherein inter-prediction of fields is used and reference lists are assigned to the fields for indicating reference frames or fields, comprises that, if within such reference list a reference to another frame is included, then references to both fields of the other frame are included separately in direct sequence. Further, a temporal level is assigned to each of the frames according to their display order, and for the frames of all except one temporal level the quantization parameter is higher for one type of fields than for the other type of fields.

10 Claims, 3 Drawing Sheets

METHOD AND APPARATUS FOR CODING INTERLACED VIDEO DATA

This application claims the benefit, under 35 U.S.C. §365 of International Application PCT/EP2006/069290, filed Dec. 5, 2006, which was published in accordance with PCT Article 21(2) on Jul. 19, 2007 in English and which claims the benefit of European patent application No. 06300032.7, filed Jan. 13, 2006.

FIELD OF THE INVENTION

This invention relates to encoding and decoding of interlaced video data. In particular, the invention relates to encoding and decoding of bi-directionally predicted frames in interlaced video data.

BACKGROUND

In the SVC standard being currently defined by the Joint Video Team (JVT) of MPEG & ITU, an encoding solution for progressive video material is given. Spatial scalability is considered only for progressive material.

SVC employs hierarchical B (bi-directionally predicted) frame structures as a default during the encoding, wherein a predefined temporal pattern is assigned to the frames according to their display order, and this always leads to some default performance of the decoder.

Currently, JSVM encoders support open-loop encoding and closed-loop encoding.

For open-loop encoding, the B pictures are encoded by using the mode and motion information generated by doing the motion estimation and mode decision based on the original references. That is, reference frames for prediction at the encoder are frames that were previously encoded.

Closed-loop encoding uses reconstructed frames as reference frames, which contain a quantization error.

Normally, closed-loop encoding is better to constrain the error and reduce the possible propagation effect caused by quantization and inaccurate motion estimation. Open-loop encoding is more flexible for handling the FGS (Fine Grain Scalability) layer and can easier support MCTF (Motion-Compensated Temporal Filtering).

Reference frame lists for prediction of P and B pictures that are constructed at the encoder have always the same structure, depending on the GOP size. P and B pictures use one list (list_0) for forward prediction, i.e. prediction from frames with lower POC (picture_order_count) number. B pictures use also a second list (list_1) for backward prediction, i.e. prediction from frames with higher POC number. The reference lists are truncated after a specified number of reference frames. The lowest temporal level, or low-pass level, contains the Key pictures. For different spatial layers, such as base layer (BL) and enhancement layer (EL), the reference list construction method is the same.

There are some basic rules that known encoders follow: From the previous GOP (group-of-pictures), only the Key picture is used for the encoding process of the next GOP, while other pictures of the previous GOP will not be used and are removed from the short term reference list by MMCO (Memory Management Control Operation) commands.

Frames at the same temporal level do not reference each other, except for Key frames.

For motion estimation (ME) in closed-loop encoding, a frame will only refer frames with higher temporal level, because the encoder performs motion estimation for the higher temporal level frames first. For ME in open-loop encoding however the ME for lower temporal levels is done first.

Reference lists are generated by RPLR (Reference Picture List Reordering) commands. MMCO commands are used to remove the B frames (or rather: non-key pictures) and unused Key frames of previous GOPs out of the short term list. These commands are invoked at the slice header of the Key pictures.

To improve coding efficiency, quantization parameters (QP) can be adapted by scaling factors (SF). Frames are given different QPs at the encoder, which depends on two values according to the formula $$qp_i = qp_{i-1} - 6 \cdot \log_2(SF)$$

That means that the QP of each temporal level i is adjusted by the scaling factor SF, and the scaling factor is used to balance the residual energies of frames of different temporal levels.

For open-loop encoding, the scaling factor is calculated as the sum energy proportion of the blocks. Each blocks energy proportion is calculated depending on how it is predicted by other blocks. If it is bi-predicted, actually the energy proportion is calculated using the filter [−½, 1, −½]. To normalize the energy improvement of this block, a factor of $(-½)^2 + 1^2 + (-½)^2 - 1$ is introduced. If the block is just in one direction predicted, the motion compensation (MC) uses the filter [1, −1]. To normalize the energy improvement for this block, a factor of $(½)^2 + (½)^2 - 1$ is introduced.

In temporal level i, all blocks have these factors, and its sum is used to calculate the scaling factor of level i−1.

$$ScalingFactor_i = ScalingFactor_{i-1} \cdot \sqrt{\sum_{blocks\ in\ temporl\ level\ i-1} factor + 1}$$

For closed-loop encoding, the idea is the same, but when a temporal level i is encoded then it is unknown how many blocks in temporal level i−1 use bi-directional prediction. So a ratio of bi-prediction and one-direction prediction is estimated, e.g. 60/40.

However, to support interlace coding, which means all or some frames are coded as two interlacing field pairs, namely top field and bottom field, a different solution is needed.

SUMMARY OF THE INVENTION

The present invention provides a way to construct reference lists for interlace video coding. These reference lists can be used as default reference lists.

According to one aspect of the invention, a method for encoding interlaced video, wherein the video contains frames with interlacing fields of at least two types, top or bottom, and wherein inter-prediction of fields is used and reference lists are assigned to the fields for indicating reference frames or fields, is characterized in that, if within such reference list a reference to another frame is included, then references to both fields of the other frame are included separately and in direct sequence.

In one embodiment, the method for encoding interlaced video can be further specified in that a first of the two fields of a frame has a reference to the other field of the same frame, while said other field has no reference to said first field.

In one embodiment, the method for encoding interlaced video can be further specified in that for a field of a first type, e.g. bottom, the first of the references to the fields of another frame refers to the field with the same field type, e.g. bottom, and the second of the references to said other frame refers to the field with opposite field type, in this example top.

In one embodiment, the method for encoding interlaced video can be further specified in that frames are grouped in GOPs, and wherein only one frame outside a current group may be referenced, the one frame having assigned the lowest temporal level of the previous group.

In one embodiment, the method for encoding interlaced video can be further specified in that the video data are quantized using quantization parameters (QP), wherein for the fields of a frame different quantization parameters are used.

In one embodiment, the method for encoding interlaced video can be further specified in that a temporal level is assigned to each of the frames according to their display order, and wherein for the frames of all except one temporal level the quantization parameter is higher for one field type than for the other field type.

According to another aspect of the invention, a method for decoding interlaced video, wherein the video contains frames with interlacing fields of at least two types, e.g. top and bottom, and wherein prediction of fields is used, is characterized in that, if another interlaced frame is used as reference for prediction, then both fields of the other frame are used in direct sequence as separate references.

In one embodiment, the method for decoding interlaced video can be further specified in that a first of the two fields of a frame has a reference to the other field of the same frame, while said other field has no reference to said first field.

In one embodiment, the method for decoding interlaced video can be further specified in that for a field of a first type the first of the references to the fields of another frame refers to the field with the same field type, and the second of the references to said other frame refers to the field with opposite field type.

According to yet another aspect of the invention, a signal containing interlaced video data, wherein the video data contain frames with interlacing fields of at least two types, and wherein for inter-prediction of fields from other frames or fields reference lists are contained for indicating reference frames or fields, and wherein, if within such reference list a reference to another frame is included, then references to both fields of the other frame are included in direct sequence.

In one embodiment of the invention, the frames and/or fields have temporal levels assigned, and the list of reference frames or fields of a given frame or field comprises all frames or fields of the current GOP with a lower temporal level (ie. previously decoded) than the temporal level of the given frame or field.

According to one aspect of the invention, the top field and bottom fields of the frames of the same temporal level of interlaced video are handled in principle like different temporal levels.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which shows in FIG. 1 the conventional reference list construction for hierarchical B frame GOP structures.

DETAILED DESCRIPTION OF THE INVENTION

Figure 1:
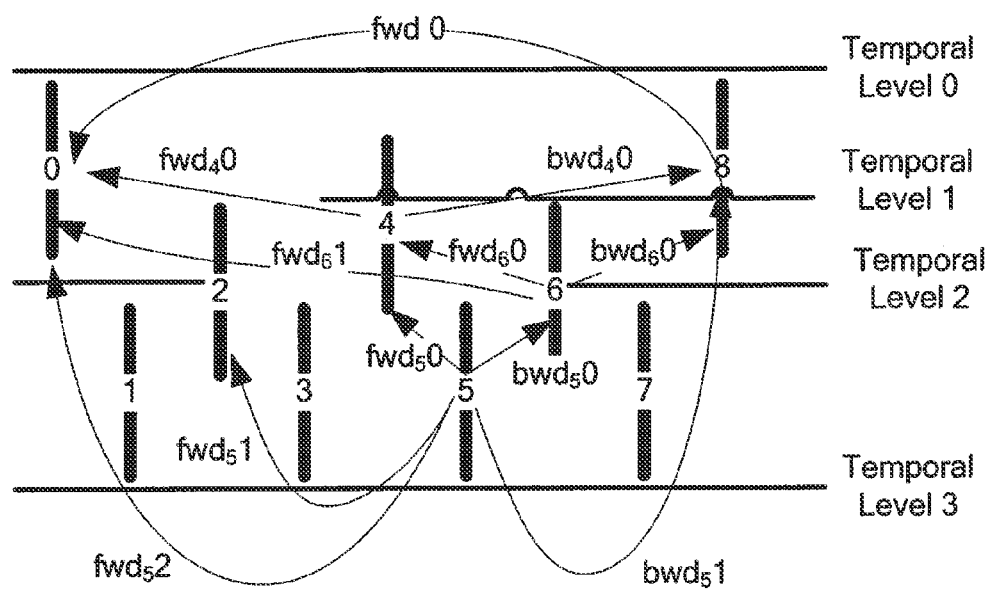

FIG. 1 shows the conventional reference list construction for hierarchical B picture GOP structures, as used e.g. by the JSVM encoder. The frames are denoted using their POC numbers. Exemplarily, a hierarchical B structure with GOP size equal to 8 is shown, so that there are four temporal levels. Temporal Level 0 has frames 0 and 8. Actually the first GOP of a sequence is depicted, but any GOP will be coded the same way, because only the Key picture of the previous GOP will be used for the encoding process of the next GOP. Other pictures of the previous GOP will not be referenced and will be removed from the short term list by MMCO commands.

There are some basic rules that the encoder will follow. First, frames at the same temporal level do not reference each other, except for Key frames. As shown in FIG. 1, it doesn't matter if it is a base layer GOP or enhancement layer GOP, the reference list construction method is the same. E.g. frame 6 will not refer frame 2.

Second, one frame will only refer frames with higher temporal level. One reason is that the encoder will code the higher temporal level frames first.

Third, for each B picture, list_0 and list_1 also have some constraints. List_0 (denoted with fwd in FIG. 1) will never use a frame with larger POC number than that of the current B picture. List_1 (denoted with bwd in FIG. 1) will never use a frame with smaller POC number than that of the current B picture. E.g. for frame 5 the list_0 is {4,2,0} corresponding to $fwd_50$, $fwd_51$, $fwd_52$, and list_1 is {6,8} corresponding to $bwd_50$, $bwd_51$.

After the rules above, the list will be truncated by the number of reference specified in the encoding configuration and a low delay constraint, which may be also specified at the encoder configuration.

The present invention provides methods for constructing and using the default reference lists for interlaced video. For convenience, a Pic_Type item is introduced to denote how a current frame or field is coded. If it is frame coded (progressive), its Pic_Type is FRAME. It is field coded (interlace) and it is a top field, the Pic_Type is TOP_FIELD, and if it is field coded and it is bottom field, the Pic_Type is BOT_FIELD.

Figure 2:
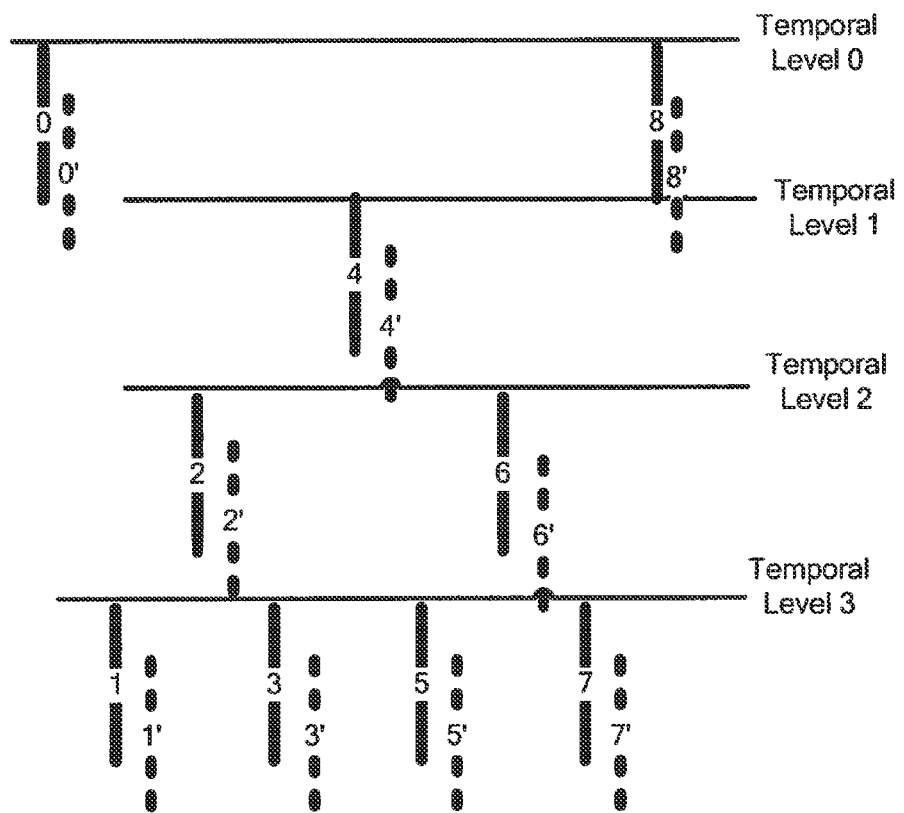
FIG. 2 temporal levels of an interlace coded hierarchical B GOP structure.

FIG. 2 shows temporal levels of an interlace only coded hierarchical B GOP structure. Solid lines stand for top fields 0, . . . , 8 and dotted lines stand for bottom fields 0', . . . , 8'. Each field pair belongs to the same frame and uses the same POC number. E.g. temporal level 1 contains the frame with POC=4, which consists of the top field 4 and the bottom field 4'.

Exemplary encoding rules for interlaced hierarchical B pictures are described in the following.

Firstly, a pair of fields with the same frame_num and belonging to the same frame should be referenced continuously, i.e. in direct sequence. The field with the same Pic_Type as the current field will be put into the reference list first, and is followed by the other field that belongs to the same field pair but has different Pic_type.

Secondly, if one field is in the reference list, then its corresponding pair should also be in the reference list (except for the corresponding top field of the currently encoding bottom field, and unless the size of the reference list is larger than the specified size).

Third, like the current JSVM encoder does for frames, fields with larger POC will not be used as reference fields in list_0, and fields with smaller POC will not be used as reference fields in list_1.

Fourth, the reference list_1, no matter if for a top field or bottom field, can not have a reference field with the same frame_num as the current field.

Figure 3:
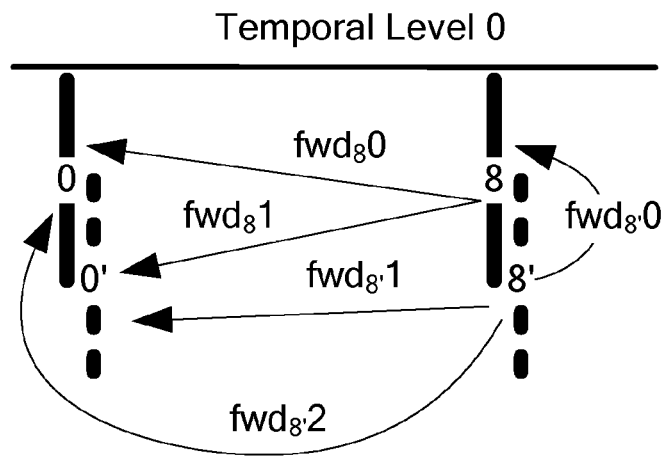
FIG. 3 default reference lists for interlace coded hierarchical B pictures for top and bottom Key fields.
Figure 4:
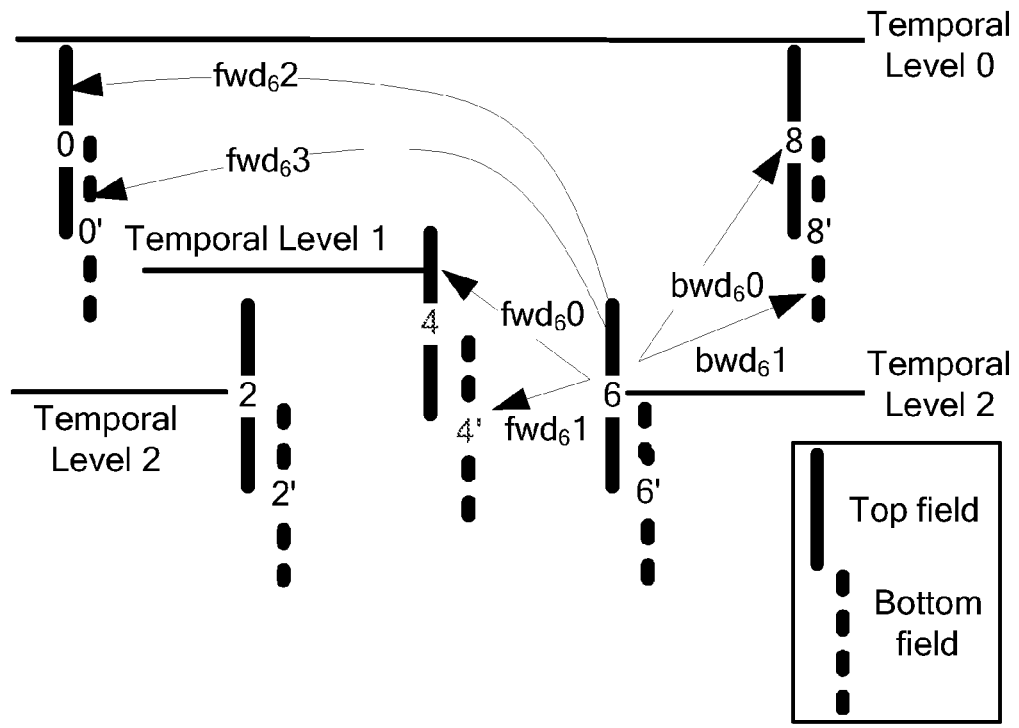
FIG. 4 reference list construction for top B fields.
Figure 5:
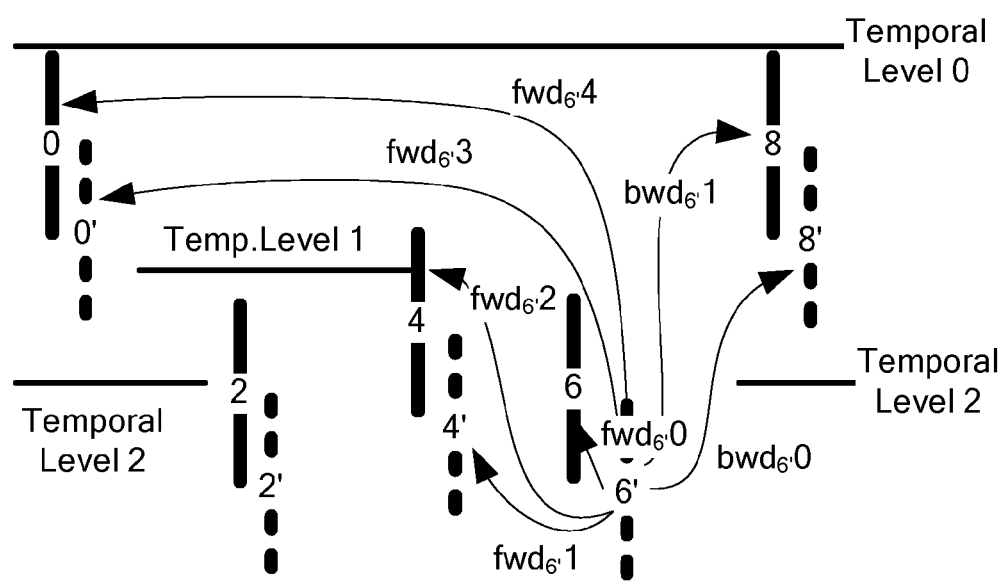
FIG. 5 reference list construction for bottom B fields.

FIGS. 3-5 show exemplary default reference lists for interlace coded hierarchical B pictures with GopSize=8. FIG. 3 shows an example of reference lists construction for the Key fields. The top field 8 gets the top field 0 of the previous Key picture as first reference $fwd_8 0$ (Ref_Idx=0) and the bottom field 0' of the previous Key Picture as second reference $fwd_8 1$. The bottom field 8' of the Key picture gets the top field 8 of the same picture as the very first reference (with Ref_Idx=0) $fwd_8.0$, the bottom field 0' of the previous Key Picture as second reference $fwd_8.1$ and top field 0 of the previous Key Picture as third reference $fwd_8.2$.

Generally for B pictures, the reference list of top fields is constructed like the reference list for progressive encoding, as described above. The difference is that each frame will now be turned into a field pair, namely first the top field and then the bottom field. As shown in FIG. 4, the top field 6 of the picture with POC=6 has the following ordered reference list_0 ($fwd_6 0$, $fwd_6 1$, $fwd_6 2$, $fwd_6 3$): 4 top, 4 bottom, 0 top, 0 bottom. Its reference list_1 ($bwd_6 0$, $bwd_6 1$) is: 8 top, 8 bottom.

If a B field is a bottom field, its reference list_0 gets first its corresponding top field, if (and only if) its nal_ref_idc is not zero. A nal_ref_idc of a frame/field means that this frame/field will not be used as a reference. At the encoder, the nal_ref_idc values of fields/frames with the highest temporal level are set to zero. FIG. 5 shows that e.g. for the bottom field of picture 6 the top field of picture 6 will be used as the very first reference 0 ($fwd_{6'} 0$), since this frame usually has the closest temporal distance (in terms of display time) compared to other available fields in the short term list at the decoder. Then, other fields will be constructed with the field pairs. The final ordered reference list_0 for the picture 6 bottom field is ($fwd_{6'} 0$, $fwd_{6'} 1$, $fwd_{6'} 2$, $fwd_{6'} 3$, $fwd_{6'} 4$) 6 top, 4 bottom, 4 top, 0 bottom, 0 top. For list_1, it just has the field pairs ($bwd_{6'} 0$, $bwd_{6'} 1$): 8 bottom, 8 top.

In one embodiment, the reference lists can be truncated as known for progressive encoding by the number of references specified in the encoding configuration and the low delay constraint, which may be also specified at the encoder configuration.

In one embodiment, different references are used for open-loop and closed-loop encoding during the motion estimation (ME) process. For open-loop encoding, the original fields are used during ME, while for closed-loop encoding the reconstructed fields are used during ME. Even when a bottom field references its corresponding top field, the reference should be the reconstructed top field.

Even for the Picture Adaptive Frame Field Coding (PAFF) case, the proposed reference list construction method for field coded pictures and for frame coded pictures can be used.

RPLR and MMCO Commands for field

In one embodiment, RPLR commands are also implemented to specify the above reference list construction.

If the Key picture is frame coded, the MMCO field is used (like in the original JSVM solution). If the Key picture is field coded, the MMCO commands will be generated at the top field of the Key picture to delete all the field pairs of all the non-Key pictures of the previous GOP and the Key picture before the Key picture of previous GOPs (if such exist).

Scaling Factors for Interlace Encoding

In one embodiment of the invention, QP adaptation is used also for interlace coding. In this case, the top field and the bottom field get different scaling factors, which is advantageous due to their different residual energy. A top field has always a higher QP than its corresponding bottom field, if these field pairs do not belong to the highest temporal level. Thus, in this embodiment top fields and bottom fields of interlaced pictures are handled in principle like different temporal levels, with separate different scaling factors.

So if the current temporal level is not the highest, different scaling factors can be introduced for top and bottom fields even they are in the same temporal level.

One embodiment of the invention is a total solution for interlace encoding for SVC hierarchical B frame structures.

One embodiment of the invention is a default reference list construction method, which can be used at the encoder and is the default solution of the enhancement layer decoder for interlace or PAFF encoding.

In one embodiment, corresponding RPLR and MMCO commands are used to support hierarchical B picture PAFF encoding.

In one embodiment, different scaling factors are introduced for top and bottom field in the same temporal level to improve the coding efficiency.

As was mentioned before, a reference list may be truncated after a defined maximum length. As an exception to the above-defined rule, this may lead to the case that only one field of a frame is included in the list, while the other field must be excluded because the list would otherwise be too long.

An encoder for interlaced video according to the invention, wherein the video contains frames with interlacing fields of at least two types, has means for inter-predicting fields from other fields or frames, means for generating reference lists, means for assigning the reference lists to the fields for indicating reference frames or fields, wherein references to both fields of other frames are included in each list if within such reference list a reference to another frame is included, wherein the references to the two fields of a particular frame are included separately and in direct sequence.

In one embodiment, the means for generating reference lists generates for the first of the two fields of a frame a reference to the other field of the same frame, while it generates for said other field no reference to said first field.

In one embodiment, the means for generating reference lists generates, in the case of referencing another frame, for a field of a first type, e.g. top, always first a reference to the field with the same field type, i.e. top, and then a reference to the field with opposite field type, i.e. bottom.

In one embodiment, the encoder comprises means for quantizing the video data by quantization parameters, wherein for the fields of a frame different quantization parameters are used.

In one embodiment, the encoder comprises means for assigning a temporal level to each of the frames according to the frames display order, and wherein for the frames of all except one temporal level the quantization parameter is higher for one type of fields than for the other.

A decoder for interlaced video according to the invention, wherein the video contains frames with interlacing fields of at least two types, comprises means for predicting fields from other fields or frames, wherein, if another interlaced frame is used as reference for prediction, then the means uses both fields of the other frame in direct sequence as separate references.

The invention can be used for encoding/decoding interlaced video data, and in particular spatially and/or temporally scalable interlaced video data. In principle the invention is also usable for single spatial layer video with multiple temporal levels.

The invention claimed is:

1. Method for encoding interlaced video data being quantized using quantization parameters, wherein the video data contain frames with interlacing fields of at least two types and inter-prediction of fields is used and reference lists are assigned to the fields for indicating reference frames or fields, wherein, if within such reference list a reference to another frame is included, then references to both fields of the other frame are included separately in direct sequence, and wherein for the fields of a frame different quantization parameters are used, and wherein a temporal level is assigned to each of the frames according to their display order and for the frames of all except one temporal level the quantization parameter is higher for one type of fields than for the other type of fields.

2. Method according to claim 1, wherein a first of the two fields of a frame has a reference to the other field of the same frame, while said other field has no reference to said first field.

3. Method according to claim 1, wherein for a field of a first type the first of the references to the fields of another frame refers to the field with the same field type and the second of the references to said other frame refers to the field with opposite field type.

4. Method according to claim 1, wherein frames are grouped, and wherein only one frame outside a current group may be referenced, the one frame having assigned the lowest temporal level of the previous group.

5. Method for decoding interlaced video data being quantized using quantization parameters, wherein the video data contain frames with interlacing fields of at least two types, and wherein prediction of fields is used and wherein, if another interlaced frame is used as reference for prediction, then both fields of the other frame are used as separate references in direct sequence, and wherein a temporal level is assigned to each of the frames according to their display order and for the frames of all except one temporal level the quantization parameter is higher for one type of fields than for the other type of fields.

6. Method according to claim 5, wherein a first of the two fields of a frame has a reference to the other field of the same frame, while said other field has no reference to said first field.

7. Method according to claim 5, wherein for a field of a first type the first of the references to the fields of another frame refers to the field with the same field type, and the second of the references to said other frame refers to the field with opposite field type.

8. Non-transitory computer readable media containing interlaced video data, wherein the video data are quantized using quantization parameters and contain frames with interlacing fields of at least two types, and wherein for inter-prediction of fields from other frames or fields reference lists are contained for indicating reference frames or fields, and wherein, if within such reference list a reference to another frame is included, then references to both fields of the other frame are included in direct sequence, and wherein a temporal level is assigned to each of the frames according to their display order and for the frames of all except one temporal level the quantization parameter is higher for one type of fields than for the other type of fields.

9. Signal according to claim 8, wherein the frames or fields have temporal levels assigned, and the list of reference frames or fields of a given frame or field comprises all frames or fields of the current GOP with a lower temporal level than the temporal level of the given frame or field.

10. Signal according to claim 8, wherein for a field of a first type the first of the references to the fields of another frame refers to the field with the same field type and the second of the references to said other frame refers to the field with opposite field type.

* * * * *